United States Patent
Ito et al.

(10) Patent No.: US 10,536,048 B2
(45) Date of Patent: Jan. 14, 2020

(54) METHOD FOR MANUFACTURING SINTERED BEARING, SINTERED BEARING, AND VIBRATION MOTOR EQUIPPED WITH SAME

(71) Applicants: Yoshinori Ito, Aichi (JP); Yousuke Sugai, Aichi (JP)

(72) Inventors: Yoshinori Ito, Aichi (JP); Yousuke Sugai, Aichi (JP)

(73) Assignee: NTN CORPORATION, Osaka (JP)

( * ) Notice: Subject to any disclaimer, the term of this patent is extended or adjusted under 35 U.S.C. 154(b) by 360 days.

(21) Appl. No.: 14/777,889

(22) PCT Filed: Mar. 19, 2014

(86) PCT No.: PCT/JP2014/057442
§ 371 (c)(1),
(2) Date: Sep. 17, 2015

(87) PCT Pub. No.: WO2014/156856
PCT Pub. Date: Oct. 2, 2014

(65) Prior Publication Data
US 2016/0301279 A1   Oct. 13, 2016

(30) Foreign Application Priority Data

Mar. 25, 2013 (JP) .................. 2013-062176
Apr. 9, 2013 (JP) .................. 2013-081174
(Continued)

(51) Int. Cl.
*H02K 5/16* (2006.01)
*F16C 33/06* (2006.01)
(Continued)

(52) U.S. Cl.
CPC ............. *H02K 5/16* (2013.01); *F16C 33/104* (2013.01); *F16C 33/128* (2013.01);
(Continued)

(58) Field of Classification Search
CPC .......... H02K 5/16; H02K 5/167; H02K 7/065; H02K 7/083; F16C 33/128; F16C 33/104;
(Continued)

(56) References Cited

U.S. PATENT DOCUMENTS 4,959,274 A * 9/1990 Mori ....................... B32B 15/01
428/334
5,395,807 A 3/1995 Divakar et al.
(Continued)

FOREIGN PATENT DOCUMENTS

CN 2648688 10/2004
CN 101573196 11/2009
(Continued)

OTHER PUBLICATIONS

KR 20080078537 A (English Translation).*
(Continued)

*Primary Examiner* — Mang Tin Bik Lian
*Assistant Examiner* — Alexander Moraza
(74) *Attorney, Agent, or Firm* — Wenderoth, Lind & Ponack, L.L.P (57) ABSTRACT

The present invention relates to a method for manufacturing a sintered bearing having a bearing surface that forms a bearing gap with a shaft to be supported, in its inner periphery. This manufacturing method includes: a compacting step P2 of compacting a base powder containing a diffusion alloyed powder 11 prepared by partially diffusing a copper powder in an iron powder as a main material, a low-melting-point metal powder 14, and a solid lubricant to
(Continued)

obtain a green compact, and a sintering step P3 of sintering the green compact 4' to obtain a sintered compact 4".

10 Claims, 5 Drawing Sheets

(30) Foreign Application Priority Data

| | | |
|---|---|---|
| Jan. 20, 2014 | (JP) | 2014-007916 |
| Jan. 21, 2014 | (JP) | 2014-008889 |

(51) Int. Cl.

| | |
|---|---|
| *F16C 33/10* | (2006.01) |
| *F16C 33/12* | (2006.01) |
| *C22C 33/02* | (2006.01) |
| *H02K 7/06* | (2006.01) |
| *B22F 1/00* | (2006.01) |
| *B22F 7/00* | (2006.01) |

(52) U.S. Cl.
CPC ............ *B22F 1/0011* (2013.01); *B22F 7/00* (2013.01); *C22C 33/0207* (2013.01); *F16C 2204/60* (2013.01); *F16C 2380/26* (2013.01); *H02K 7/061* (2013.01)

(58) Field of Classification Search
CPC .......... F16C 33/10; F16C 33/12; F16C 33/14; F16C 33/145; F16C 33/1095; F16C 2380/26; F16C 2204/60; B22F 1/025; B22F 3/16; B22F 5/10; B22F 2998/10; B22F 3/1035; B22F 3/1007; B22F 2003/023; B22F 2201/30
USPC ...... 310/81, 90; 384/91, 104, 114, 193, 199, 384/226
See application file for complete search history.

(56) References Cited

U.S. PATENT DOCUMENTS

| | | | |
|---|---|---|---|
| 5,589,428 | A | 12/1996 | Divakar et al. |
| 5,635,430 | A | 6/1997 | Divakar et al. |
| 5,766,304 | A * | 6/1998 | Uenosono .............. B22F 1/0059 75/252 |
| 5,834,387 | A | 11/1998 | Divakar et al. |
| 5,941,646 | A * | 8/1999 | Mori ...................... F16C 17/026 384/100 |
| 2002/0043131 | A1 | 4/2002 | Nakamura et al. |
| 2003/0008169 | A1* | 1/2003 | Sakai ...................... B22F 7/008 428/676 |
| 2003/0056621 | A1 | 3/2003 | Nakamura et al. |
| 2003/0215349 | A1 | 11/2003 | Nakamura et al. |
| 2005/0063856 | A1* | 3/2005 | Miyasaka ............ C22C 33/0207 419/1 |
| 2007/0063602 | A1* | 3/2007 | Ibata ...................... H02K 7/061 310/81 |
| 2009/0285514 | A1* | 11/2009 | Hori ...................... F16C 17/107 384/107 |
| 2011/0243484 | A1 | 10/2011 | Lee et al. |
| 2012/0177528 | A1 | 7/2012 | Takayama |
| 2013/0182979 | A1 | 7/2013 | Ito et al. |
| 2015/0285300 | A1 | 10/2015 | Ito et al. |

FOREIGN PATENT DOCUMENTS

| | | |
|---|---|---|
| CN | 101684536 | 3/2010 |
| EP | 2 357 258 | 8/2011 |
| EP | 2 913 546 | 9/2015 |
| GB | 2 220 421 | 1/1990 |
| GB | 2 333 779 | 8/1999 |
| JP | 48-44108 | 6/1973 |
| JP | 63290245 A * | 11/1988 |
| JP | 63-297502 | 12/1988 |
| JP | 7-33550 | 2/1995 |
| JP | 8-20836 | 1/1996 |
| JP | 8-92604 | 4/1996 |
| JP | 09-095759 | 4/1997 |
| JP | 11-050103 | 2/1999 |
| JP | 11-117044 | 4/1999 |
| JP | 2000-291659 | 10/2000 |
| JP | 2001-003123 | 1/2001 |
| JP | 2001-123253 | 5/2001 |
| JP | 2001-178100 | 6/2001 |
| JP | 2001-251393 | 9/2001 |
| JP | 2002-146403 | 5/2002 |
| JP | 2002-349575 | 12/2002 |
| JP | 2003-184882 | 7/2003 |
| JP | 2003-253372 | 9/2003 |
| JP | 2004-149708 | 5/2004 |
| JP | 3613569 | 1/2005 |
| JP | 2006-233331 | 9/2006 |
| JP | 2007-169736 | 7/2007 |
| JP | 2008-99355 | 4/2008 |
| JP | 20080078537 A * | 8/2008 |
| JP | 2008-232230 | 10/2008 |
| JP | 2010-71350 | 4/2010 |
| JP | 2010-77474 | 4/2010 |
| JP | 2010-180331 | 8/2010 |
| JP | 2011094167 A * | 5/2011 |
| JP | 2011-127742 | 6/2011 |
| JP | 2011-208735 | 10/2011 |
| JP | 2012-67893 | 4/2012 |
| WO | 2013/042664 | 3/2013 |

OTHER PUBLICATIONS

JP 63290245 A (English Translation).*
JP 2011094167 A (English Translation).*
International Preliminary Report on Patentability and Written Opinion of the International Searching Authority dated Sep. 29, 2015, in International PCT Application No. PCT/JP2014/057442.
Partial Supplementary European Search Report dated Nov. 21, 2016 in corresponding European Application No. 14774064.1.
Extended European Search Report dated Apr. 4, 2017 in corresponding European Application No. 14774064.1.
Office Action with English translation of Search Report dated Apr. 6, 2017 in corresponding Chinese Application No. 201480011466.X.
International Search Report dated Jun. 10, 2014 in International (PCT) Application No. PCT/JP2014/057442.
Notice of reasons for refusal dated Oct. 19, 2017 in corresponding Japanese Application No. 2014-008889, with English translation.
European Communication pursuant to Article 94(3) EPC dated Apr. 5, 2019 in corresponding European Application No. 14 774 064.1.
S. Shanmugam et al., "Ring Rupture Strength and Hardness of Sintered Hot-Forged 1.5Mo Alloyed Carbon Steels", Journal of Materials Processing Technology, Elsevier, NL, vol. 209, No. 7, Apr. 1, 2009, pp. 3426-3430, DOI: 10/1016/J.JMATPROTEC.2008.07.043, XP026076675.
ASTM International "Standard Test Method for Radial Crushing Strength, K, of Powder Metallurgy (P/M) Bearings and Structural Materials", Nov. 30, 2005, pp. 1-3, XP055383144.

* cited by examiner

METHOD FOR MANUFACTURING SINTERED BEARING, SINTERED BEARING, AND VIBRATION MOTOR EQUIPPED WITH SAME

TECHNICAL FIELD

The present invention relates to a method for manufacturing a sintered bearing, a sintered bearing, and a vibration motor equipped with the same.

BACKGROUND ART

A sintered bearing is a porous member having innumerable internal pores, and is usually used in the condition that the internal pores are immersed with a lubricant fluid (for example, lubricating oil). In this case, as the sintered bearing and a shaft inserted on the inner periphery of the sintered bearing relatively rotate, the lubricating oil retained in the internal pores of the sintered bearing seeps onto the inner peripheral surface (bearing surface) of the sintered bearing as the temperature rises. The seeped lubricating oil forms an oil film in the bearing gap between the bearing surface of the sintered bearing and the outer peripheral surface of the shaft, and the shaft is relatively rotatably supported.

For example, Patent Document 1 below describes an iron-copper-based sintered bearing which is mainly composed of iron and copper, and which is obtained by compacting and sintering a copper-coated iron powder, in which an iron powder is coated with copper in an amount of greater than or equal to 10 mass % and less than 30 mass %, and the granularity is less than or equal to 80 mesh.

PRIOR ART DOCUMENTS

Patent Documents

Patent Document 1: Japanese Patent No. 3613569
Patent Document 2: JP 2001-178100 A
Patent Document 3: JP 2008-99355 A

SUMMARY OF THE INVENTION

Problems to be Solved by the Invention

However, examination made by the present inventors revealed that the rotation fluctuation increases when the sintered bearing to which the technical means of Patent Document 1 is applied is used, for example, in a vibration motor. This seems to be attributed to the fact that the neck strength between the iron phase (iron structure) and the copper phase (copper structure) is low in the sintered bearing obtained by compacting and sintering the copper-coated iron powder, and thus the bearing surface is worn early.

As a technical measure for improving the wear resistance of the bearing surface, it is conceived to compact and sinter a mixed powder prepared by mixing metal powders of Ni, Mo, and so on. However, metal powders of Ni, Mo, and so on are expensive, which leads to the high cost of the sintered bearing.

In light of these circumstances, an object of the present invention is to strengthen the sintered bearing and to improve the wear resistance of the bearing surface. Another object of the present invention is to provide a vibration motor capable of exerting the high rotation performance stably for a long time at low cost.

Solutions to the Problems

A vibration motor functions as a vibrator for informing incoming call or reception of an e-mail in a portable terminal such as a cellular phone, and is so designed that vibration is produced in the entire terminal by supporting axially-spaced two parts of a shaft to which a weight (decentered weight) is attached, by a cylindrical sintered bearing having a bearing surface on the inner periphery, and by rotating the shaft with a motor part, as described, for example, in Patent Documents 2 and 3. The sintered bearing is fixed to the inner periphery of a housing formed, for example, of a metal material. In this vibration motor, as the motor part is energized, the weight swingably rotates along the whole surface of the bearing surface of the sintered bearing under the influence of the weight. That is, in this type of vibration motor, the shaft rotates while its center is decentered in every direction with respect to the bearing center of the sintered bearing.

Recently, further miniaturization of a vibration motor is demanded in consideration of incorporation into a so-called smartphone. When a vibration motor is miniaturized, increase in the motor power is limited. For ensuring a specified vibration performance under such a situation, there is an attempt to increase the rotation speed of the motor (10000 rpm or more) or to increase the unbalanced load of the weight, and hence the use condition of the sintered bearing for a vibration motor tends to be severer. That is, in a vibration motor, since the shaft rotates swingably along the whole surface of the bearing surface, and the bearing surface is frequently beaten by the shaft due to the unbalanced load as described above, the use condition of the sintered bearing is already severer than that of the sintered bearing of normal use (for example, a sintered bearing for a spindle motor), and the bearing surface is easily worn out. Therefore, increasing the rotation speed of the motor further promotes wear of the bearing surface, and further increases the rotation fluctuation caused by wear of the bearing surface.

The present invention devised in consideration of such circumstances is a method for manufacturing a sintered bearing having a bearing surface formed on an inner periphery thereof, the bearing surface forming a bearing gap with respect to a shaft to be supported, and the method includes: a compacting step of compacting a base powder containing a diffusion alloyed powder as a main material prepared by partially diffusing a copper powder in an iron powder, a low-melting-point metal powder and a solid lubricant powder to obtain a green compact; and a sintering step of sintering the green compact to obtain a sintered compact.

In the diffusion alloyed powder, since the copper powder is partly diffused in the iron powder, higher neck strength between the iron structure and the copper structure after sintering is obtained in comparison with the case where a copper-coated iron powder is used. In the aforementioned manufacturing method, the low-melting-point metal powder contained in the green compact melts as the green compact is sintered in the sintering step. Since the low-melting-point metal has high wettability against copper, it is possible to achieve secure bonding between an iron structure and a copper structure or between copper structures of neighboring diffusion alloyed powder grains by liquid phase sintering. In a part where a Fe—Cu alloy is formed as a result of diffusion of a part of the copper powder on the surface of the iron powder in each diffusion alloyed powder, the neck strength between the iron structure and the copper structure is further increased because the melted low-melting-point metal diffuses therein. Therefore, it is possible to manufacture a high-strength sintered compact (sintered bearing) having excellent wear resistance of bearing surface and high radial crushing strength (for example, 300 MPa or higher) without using a powder of expensive metal such as Ni or Mo, or by sintering the green compact by a low-temperature sintering in which the green compact is heated (sintered) at a relatively low temperature.

The increased wear resistance of the bearing surface makes it possible to prevent rotation fluctuation caused by wear of the bearing surface. If the sintered bearing does not have a sufficient radial crushing strength, the bearing surface deforms (circularity, cylindricity and so on of the bearing surface decreases) especially when the sintered bearing is press-fitted into the housing inner periphery. Therefore, it is necessary to additionally execute a shape correcting process such as sizing after press fitting, and to finish the bearing surface to have an appropriate shape. In contrast, if a sintered compact having high radial crushing strength can be obtained as described above, it would be possible to prevent the bearing surface from deforming as the sintered bearing is press-fitted into the housing inner periphery as much as possible, and hence, it is no longer necessary to additionally execute the aforementioned shape correcting process.

The sintering temperature (heating temperature) of the green compact can be set, for example, at greater than or equal to 820° C. and less than or equal to 900° C. By executing such a sintering process in an atmosphere containing carbon, the carbon contained in the gas diffuses into an iron structure, so that it is possible to obtain a sintered compact in which the iron structure is composed of a two-phase structure of a ferrite phase and a pearlite phase. The sintered compact in which all the iron structure is formed of a ferrite phase is applicable, however, when the iron structure is formed of the aforementioned two-phase structure, the sintered compact contains a hard pearlite phase, and the wear resistance of the bearing surface can be further improved. When the aforementioned sintering condition is employed, the copper powder contained in the green compact does not melt, and the copper is not diffused in the iron structure in association with sintering. Therefore, an appropriate amount of copper structure (bronze phase) is formed on the surface of the sintered compact. Therefore, it is possible to obtain a bearing surface having excellent initial conformability with the shaft, and a small frictional coefficient.

For obtaining the aforementioned sintered bearing (sintered compact), it is preferable to use a diffusion alloyed powder in which a copper powder having a mean grain diameter of greater than or equal to 5 μm and less than 20 μm is partially diffused in an iron powder and containing 10 to 30% by mass of Cu.

As a result of diligent efforts made by the present inventors, it was found that when a base powder contains a diffusion alloyed powder having a large grain diameter exceeding a mean grain diameter of 106 μm, a coarse pore is easily formed inside the sintered compact, resulting that required wear resistance, radial crushing strength and so on of the bearing surface cannot be necessarily ensured. Therefore, it is preferable to use a diffusion alloyed powder having an average grain size of less than or equal to 145 mesh (mean grain diameter of less than or equal to 106 μm). By using such an alloy powder, it is possible to stably obtain a sintered compact in which metal structure after sintering is uniformed, and generation of coarse pores in the metal structure (porous structure) is suppressed. As a result, it becomes possible to stably obtain a sintered bearing in which the wear resistance of the bearing surface and the radial crushing strength of the bearing are further improved.

It is preferable to use the base powder in which 0.5 to 3.0% by mass of a tin powder as a low-melting-point metal powder is mixed, and 0.3 to 1.5% by mass of a graphite powder as a solid lubricant powder is mixed. This makes it possible to stably mass produce sintered bearings capable of appropriately achieving the operation and the effect as described above.

As the iron powder constituting the diffusion alloyed powder (Fe—Cu diffusion alloyed powder), a reduced iron powder can be used. As the iron powder, for example, an atomized iron powder can be used besides the reduced iron powder, however, since the reduced iron powder is in the form of a sponge having internal pores (porous), the powder is softer than the atomized iron powder, and is excellent in compaction property. Therefore, it is possible to increase the green compact strength even at low density, and to prevent occurrence of a break or a crack. Also since the reduced iron powder is in the form of a sponge, it is more excellent in oil retention compared with the atomized iron powder.

After the sintering step, an oil-impregnating step for impregnating a lubricating oil into internal pores of the sintered compact can be provided. In this oil-impregnating step, a lubricating oil having a kinematic viscosity at 40° C. ranging from 10 to 50 mm$^2$/s, or a liquid grease based on an oil (lubricating oil) having a kinematic viscosity at 40° C. ranging from 10 to 50 mm$^2$/s can be impregnated into internal pores of the sintered compact. By impregnating a lubricating oil or a liquid grease having a kinematic viscosity at 40° C. ranging from 10 to 50 mm$^2$/s into internal pores of the sintered compact, it is possible to form an oil film with high rigidity in the bearing gap, and to obtain a sintered bearing (sintered oil-impregnated bearing) capable of avoiding increase in the rotation torque.

According to the aforementioned constitution, it is possible to produce a sintering bearing having high rotation accuracy and less rotation fluctuation at low cost.

The sintered bearing can be used in a motor, particularly, in a vibration motor. A vibration motor has a shaft, a motor part for rotationally driving the shaft, a sintered bearing having a bearing surface on its inner periphery and rotatably supporting the shaft, a weight provided on the shaft, and a housing in which the sintered bearing is fixed by press-fitting on its inner periphery, and vibration is generated by eccentrically rotating the shaft with respect to the bearing center by means of the weight.

A sintered bearing for a vibration motor which is formed of a sintered compact containing iron as a main ingredient and copper as a second major ingredient, and having a radial crushing strength of greater than or equal to 300 MPa can be used. Thus by using a sintered compact containing iron which is low in price and excellent in mechanical strength as a main ingredient, and copper which is excellent in sliding properties such as initial conformability with the shaft as a second major ingredient, it is possible to ensure high rotation performance without incurring special cost increase even when the rotation speed of the motor is increased or the unbalanced load is increased. In particular, by using the sintered bearing having a radial crushing strength of greater than or equal to 300 MPa, even when the sintered bearing is fixed to the housing inner periphery by press-fitting, deformation of the bearing surface caused by press-fitting, and reduction in circularity, cylindricity or the like of the bearing surface can be prevented as much as possible. Therefore, it is no longer necessary to additionally execute a process for finishing the bearing surface to have a specified shape and accuracy for the sintered bearing fixed to the housing inner periphery. Conversely, it is possible to employ press-fitting which is a convenient fixing means without any problem as a means for fixing the sintered bearing to the housing. Also the sintered bearing having a radial crushing strength of greater than or equal to 300 MPa makes it possible to prevent deformation or the like of the bearing surface as much as possible even when a mobile terminal into which the vibration motor is incorporated falls, and a large impact value is applied to the vibration motor (sintered bearing). As described above, according to the present invention, it is possible to provide a vibration motor capable of exerting high rotation performance stably over a long term, at low cost.

Preferable properties for a sintered bearing for a vibration motor are described below.

As is already described, as the sintered bearing, a sintered compact obtained by molding and sintering a base powder containing a diffusion alloyed powder prepared by partially diffusing a copper powder in an iron powder, a low-melting-point metal powder, and a solid lubricant powder can be used.

As the iron powder of the diffusion alloyed powder, a reduced iron powder is preferably used.

The diffusion alloyed powder having an average grain size of less than or equal to 145 mesh (mean grain diameter of less than or equal to 106 μm) is preferably used.

The sintered bearing can be obtained from a base powder in which a tin powder is used as the low-melting-point metal powder and a graphite powder is used as the solid lubricant powder. In this case, the sintered bearing can be formed of a sintered compact composed of 10 to 30% by mass of Cu, 0.5 to 3.0% by mass of Sn, 0.3 to 1.5% by mass of C, and the iron and inevitable impurities as the balance.

When the iron structure of the sintered compact is formed based on a soft ferrite phase, it is possible to weaken the aggression of the bearing surface with respect to the shaft, so that it becomes possible to suppress wear of the shaft. The iron structure based on a ferrite phase can be obtained by sintering a green compact, for example, at a temperature of less than or equal to 900° C. at which iron and carbon (graphite) do not react with each other.

The iron structure based on a ferrite phase includes a structure that is entirely a ferrite phase, and an iron structure in which a pearlite phase which is harder than the ferrite phase is present in the grain boundary of the ferrite phase. In this manner, by forming the pearlite phase in the grain boundary of the ferrite phase, it is possible to improve the wear resistance of the bearing surface in comparison with the case where the iron structure is formed solely of the ferrite phase. For achieving both suppression of wear of the shaft, and improvement in the wear resistance of the bearing surface, it is preferable that the ratio of the ferrite phase ($\alpha Fe$) and the pearlite phase ($\gamma Fe$) in the iron structure is 80 to 95% and 5 to 20%, respectively ($\alpha Fe$: $\gamma Fe$=80 to 95%: 5 to 20%). The ratio can be determined, for example, by respective area proportions of the ferrite phase and the pearlite phase in an arbitrary section of the sintered compact.

In the above configuration, porosity of the superficial part of the sintered compact, in particular, porosity of the superficial part including the bearing surface is preferably 5 to 20%. The superficial part used herein means a region spanning from the surface to 100 μm deep.

The sintered bearing can be a so-called sintered oil-impregnated bearing in which a lubricating oil is impregnated into internal pores of the sintered compact, and in this case, the lubricating oil having a kinematic viscosity at 40° C. ranging from 10 to 50 mm$^2$/s is preferably used. A liquid grease based on a lubricating oil having a kinematic viscosity at 40° C. ranging from 10 to 50 mm$^2$/s may be impregnated into the sintered compact.

In the vibration motor having the above configuration, a sintered bearing can be arranged on both sides of the axial direction of the motor part. In this case, of the sintered bearings arranged on both sides of the axial direction of the motor part, one sintered bearing is disposed between the weight and the motor part, and an axial dimension of the one sintered bearing can be made larger than an axial dimension of the other sintered bearing. With such a configuration, it is possible to set the bearing surface area of the one sintered bearing large, and hence it is possible to improve the bearing ability on the side adjacent to the weight where a relatively large unbalanced load acts. On the other hand, since the bearing area can be set small in the sintered bearing of the other side where a relatively small unbalanced load acts, it is possible to suppress increase in rotation torque as the whole vibration motor.

Effects of the Invention

As described above, according to the present invention, it is possible to provide a sintered bearing having high strength and improved wear resistance of the bearing surface.

When the sintered bearing of the present invention is used while it is incorporated into a motor, for example, in a vibration motor, it is possible to provide a motor with excellent reliability and durability at low cost. Even when the rotation speed of the vibration motor is increased or the unbalanced load is increased, high rotation performance can be exerted stably for a long term.

EMBODIMENTS OF THE INVENTION

In the following, an embodiment of the present invention will be described with reference to the drawings.

Figure 1:
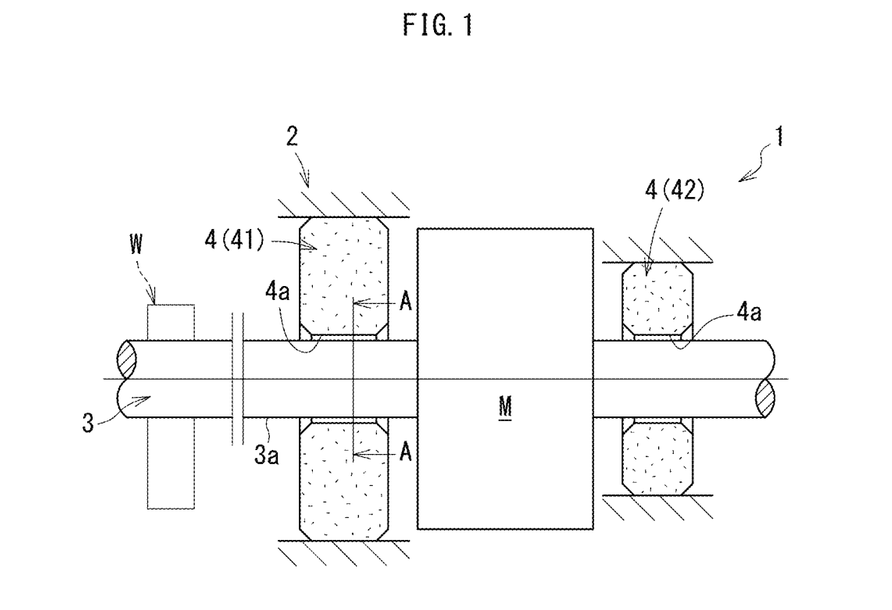
FIG. 1 is a schematic sectional view of an essential part of a vibration motor equipped with a sintered bearing.

FIG. 1 is a schematic sectional view of an essential part of a typical vibration motor. A vibration motor 1 exemplarily illustrated in the drawing includes a motor part M having a rotor magnet, a stator coil, and so on, a substantially cylindrical housing 2 formed of metal or resin, a ring-shaped sintered bearings 4 (41, 42) disposed at two points in the axial direction spaced from each other and fixed to the inner periphery of the housing 2 by press-fitting, and a shaft 3 inserted on the inner periphery of the sintered bearings 4 (41, 42). The shaft 3 is adapted to be rotationally driven at a rotation speed of greater than or equal to 10000 rpm by the motor part M disposed between the two sintered bearings 41, 42. The shaft 3 is formed of a metal material such as stainless steel, and has a diameter of less than or equal to 2 mm (preferably less than or equal to 1.0 mm). One end part of the shaft 3 is provided with a weight W integrally or separately for making the shaft 3 eccentrically rotate with respect to the sintered bearing 4. A gap width of a gap (bearing gap) formed between an outer peripheral surface 3*a* of the shaft 3 and a bearing surface 4*a* of the sintered bearing 4 is set, for example, at about 4 μm for either side (by radius). In internal pores of the sintered bearing 4, a lubricating oil (e.g., synthetic hydrocarbon-based lubricating oil) having a kinematic viscosity at 40° C. ranging from 10 to 50 mm$^2$/s is impregnated. A lubricating oil having such a low viscosity is selected and used for impregnation into internal pores of the a sintered bearing 4 so as to prevent increase in rotation torque while ensuring the rigidity of the oil film formed in the bearing gap. In internal pores of sintered bearing 4, a liquid grease based on an oil having a kinematic viscosity at 40° C. ranging from 10 to 50 mm$^2$/s may be impregnated in place of the aforementioned lubricating oil.

Figure 2:
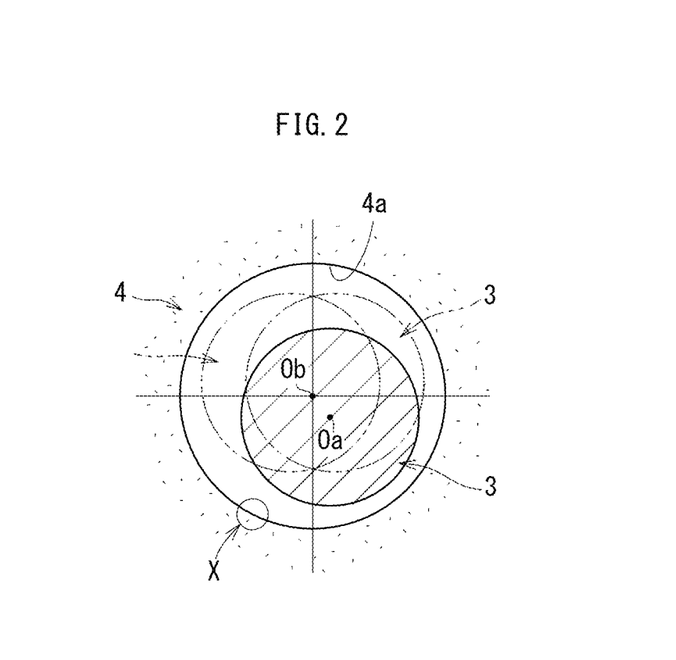
FIG. 2 is a sectional view taken along line A-A shown in FIG. 1.

In the vibration motor 1 having such a configuration, when the motor part M is energized and the shaft 3 rotates relatively to the sintered bearing 4, the lubricating oil retained in the internal pores of the sintered bearing 4 seeps onto the bearing surface 4*a* as the temperature rises. The seeped lubricating oil forms an oil film in the bearing gap between the facing outer peripheral surface 3*a* of the shaft 3 and the bearing surface 4*a* of the sintered bearing 4, so that the shaft 3 is supported by the sintered bearing 4 in a relatively rotatable manner. The shaft 3 rotates swingably along the whole surface of the bearing surface 4*a* under the influence of the weight W provided on its one end. That is, the shaft 3 rotates in the condition that a center Oa is decentered in every direction with respect to a center Ob of the sintered bearings 4 (41, 42) as shown in FIG. 2.

In the illustrated example, the axial length and the thickness in the radial direction are selected different between the two sintered bearings 41, 42 (area of the bearing surface 4*a*). Specifically, the area of the bearing surface 4*a* of the sintered bearing 41 on the side closer to the weight W is set larger than the area of the bearing surface 4*a* of the sintered bearing 42 on the side farther from the weight W. This aims at improving the bearing ability by increasing the area of the bearing surface 4*a* because a larger unbalanced load acts on the shaft 3 on the side closer to the weight W in comparison with the side farther from the weight W, while decreasing the torque by reducing the area of the bearing surface 4*a* on the side farther from the weight W because less bearing ability is required in comparison with the side closer to the weight W.

Although not illustrated, in order to prevent the lubricating oil (or liquid grease) impregnated in internal pores of the sintered bearing 4 from leaking out of the housing 2 and scattering, the vibration motor 1 may be provided with a seal member for sealing an opening of the housing 2.

Figure 3:
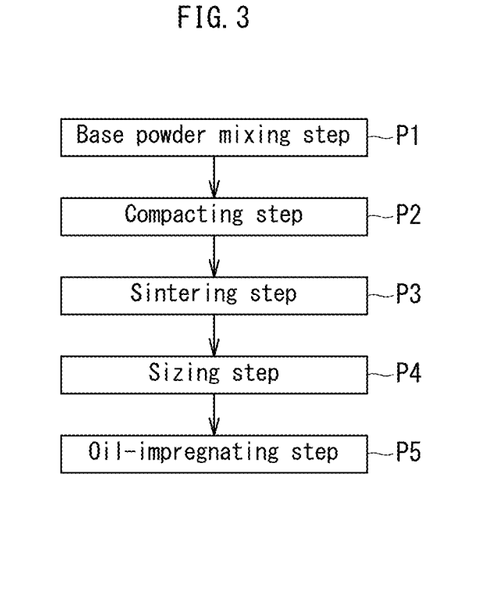
FIG. 3 is a block diagram showing a manufacturing process of the sintered bearing.

The sintered bearing 4 described in the above is formed of an iron-copper based sintered compact containing iron as a main ingredient and 10 to 30% by mass of copper, and has a radial crushing strength of greater than or equal to 300 MPa. As shown, for example, in FIG. 3, the sintered bearing 4 as described above is produced by conducting (A) base powder generating step P1, (B) compacting step P2, (C) sintering step P3, (D) sizing step P4 and (E) oil-impregnating step P5 in sequence. Hereinafter, each of these steps will be described. The two sintered bearings (41, 42) have substantially the same structure, and are manufactured in the same manufacturing procedure.

(A) Base Powder Mixing Step P1

Figure 5A:
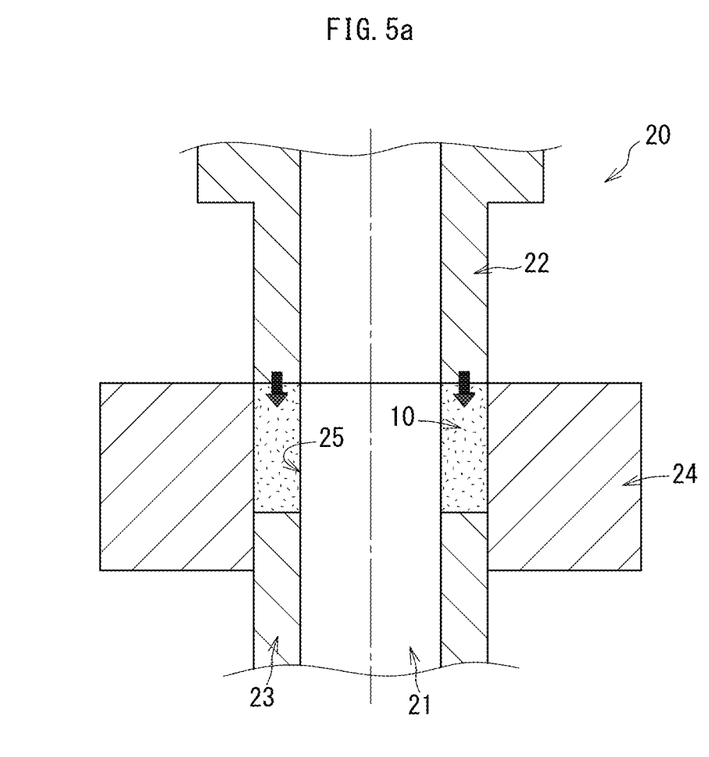
FIG. 5a is a schematic sectional view showing a compacting step.

In the base powder generating step P1, a base powder 10 (see FIG. 5(*a*)) which is a material for preparation of the sintered bearing 4 is uniformed by mixing later-described plural kinds of powder. The base powder 10 used in the present embodiment is a mixed powder containing a diffusion alloyed powder, which is also called partially alloyed powder or partially pre-alloyed powder, as a main material, a low-melting-point metal powder, and a solid lubricant powder. A variety of molding lubricants (for example, a lubricant for improving release properties) may be added to the base powder 10 as is necessary. Hereinafter, each powder will be described in detail.

[Diffusion Alloyed Powder]

Figure 4:
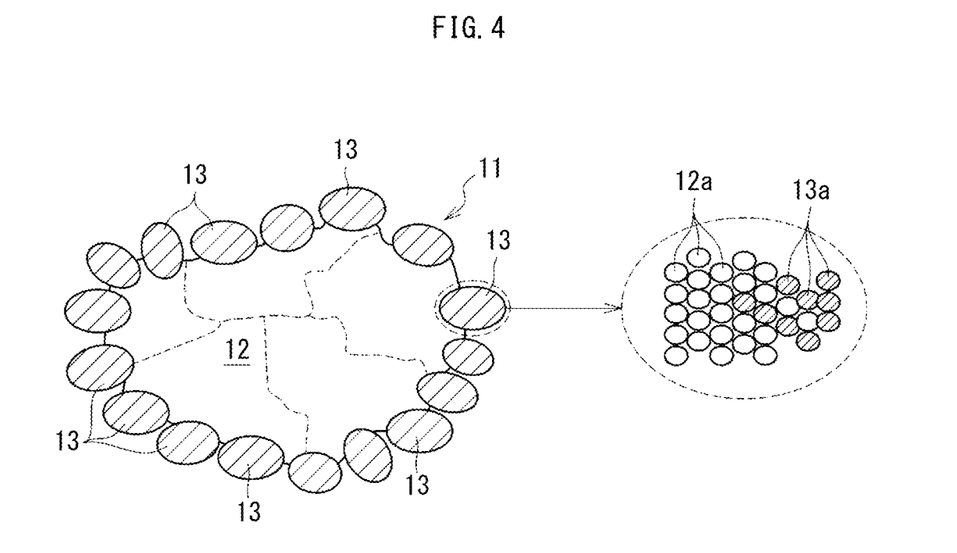
FIG. 4 is a view schematically showing a diffusion alloyed powder.

As shown in FIG. 4, as the diffusion alloyed powder 11, a Fe—Cu diffusion alloyed powder prepared by partially diffusing a copper powder 13 on the surface of an iron powder 12 is used, and in the present embodiment, a Fe—Cu diffusion alloyed powder prepared by partially diffusing a large number of copper powder grains 13 having a mean grain diameter smaller than that of the iron powder grain 12 on the surface of the iron powder grain 12 is used. The diffused part of the diffusion alloyed powder forms a Fe—Cu alloy, and as shown in the partial enlarged view in FIG. 4, the alloy part has such a crystalline structure that an iron atom 12*a* and a copper atom 13*a* are mutually bound and arrayed. As the diffusion alloyed powder 11, only grains having an average grain size of less than or equal to 145 mesh (mean grain diameter of less than or equal to 106 μm) are used.

As to powder, the apparent density decreases and the powder becomes more likely to float as its grain diameter decreases. Therefore, when the diffusion alloyed powder 11 having a small grain diameter is abundantly contained in the base powder, the filling rate of the base powder with respect to a molding die (cavity) decreases in the later-described compacting step P2, and it becomes difficult to stably obtain a green compact of a specified shape and density. Specifically, the inventors found that the aforementioned problem is likely to arise when 25% by mass or more of the diffusion alloyed powder 11 having a grain diameter of less than or equal to 45 μm is contained. Therefore, as the diffusion alloyed powder 11, it is preferable to select and use the diffusion alloyed powder 11 having an average grain size of less than or equal to 145 mesh (mean grain diameter of less than or equal to 106 μm), and not containing 25% by mass or more of grains having an average grain size of less than or equal to 350 mesh (mean grain diameter 45 μm). The mean grain diameter can be measured by a laser diffraction scattering method (using, for example, SALD31000 available from Shimadzu Corporation) including irradiating a group of grains with laser beam, and determining a grain size distribution and a mean grain diameter by calculation from the intensity distribution pattern of the diffracted and scattered light emitted therefrom (a mean grain diameter of later-described powder can also be determined in a similar manner).

As the iron powder 12 forming the diffusion alloyed powder 11, a known iron powder such as a reduced iron powder, an atomized iron powder or the like can be used without any problem, and in the present embodiment, a reduced iron powder is used. The reduced iron powder is also called a sponge iron powder because it has an irregular shape approximate to a sphere, and is spongy (porous) with internal pores. The iron powder 12 used herein preferably has a mean grain diameter ranging from 20 μm to 106 μm, and more preferably has a mean grain diameter ranging from 38 μm to 75 μm.

As the copper powder 13 forming the diffusion alloyed powder 11, a generally used irregular-shaped or arborized copper powder can be widely used, and for example, an electrolytic copper powder, an atomized copper powder or the like is used. In the present embodiment, an atomized copper powder having a large number of recesses and protrusions on the surface, and forming an irregular shape approximate to a sphere as the entire grain, and having excellent moldability is used. The copper powder 13 having a smaller grain diameter than the iron powder 12 is used, and specifically, the copper powder 13 having a mean grain diameter of greater than or equal to 5 μm and less than or equal to 20 μm (preferably less than 20 μm) is used. The proportion of Cu in each diffusion alloyed powder grain 11 is 10 to 30% by mass (preferably 22 to 26% by mass), and is equivalent to the mass proportion of copper contained in the sintered compact 4″ obtained in the sintering step P3 (strictly, a mass proportion of copper when the sintered compact 4″ does not contain Sn and C). That is, in the present embodiment, a simple copper powder or iron powder is not mixed in the base powder 10. Although a simple copper powder or iron powder may be mixed into the base powder, if a simple copper powder is mixed, it becomes difficult to improve the wear resistance of the bearing surface 4a. Therefore, an indentation (recess) is more likely to be formed on the bearing surface 4a, for example, when the bearing surface 4a collides with the shaft 3 as the shaft 3 rotates. If a simple iron powder is mixed, it becomes difficult to obtain a sintered compact (sintered bearing) having a desired radial crushing strength. Therefore, it is preferable not to mix a simple copper powder or iron powder into the base powder.

[Low-Melting-Point Metal Powder]

As the low-melting-point metal powder, metal powder having a melting point of less than or equal to 700° C., for example, powder of tin, zinc, phosphorus or the like is used. In the present embodiment, among these, a tin powder 14 that is easily diffused (compatible) to copper and iron, and can be used as a single powder (see FIG. 6), in particular, an atomized tin powder is used. The tin powder (atomized tin powder) 14 having a mean grain diameter ranging from 5 to 63 μm is preferably used, and the tin powder (atomized tin powder) 14 having a mean grain diameter ranging from 20 to 45 μm is more preferably used. The tin powder 14 is mixed at 0.5 to 3.0% by mass in the base powder 10.

[Solid Lubricant]

As the solid lubricant, one or two or more kinds of powder of graphite, molybdenum disulfide or the like can be used. In the present embodiment, a graphite powder, in particular, a flake graphite powder is used in consideration of the cost. The graphite powder is mixed at 0.3 to 1.5% by mass in the base powder 10.

(B) Compacting Step P2

Figure 5B:
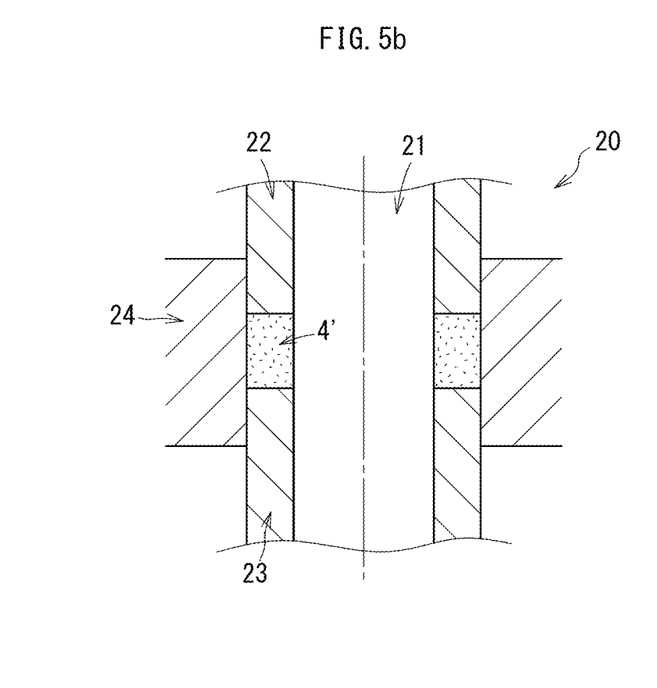
FIG. 5b is a schematic sectional view showing a compacting step.

In this compacting step P2, by compacting the base powder 10 by using the molding die 20 as illustrated in FIG. 5a and FIG. 5b, a ring-shaped green compact 4′ having a shape approximate to the sintered bearing 4 as illustrated in FIG. 1 or the like (approximately finished product shape) is obtained. The molding die 20 mainly has a core 21, an upper punch 22, a lower punch 23, and a die 24, which are coaxially disposed. The molding die 20 is set, for example, in a die set of a cam type molding pressing machine.

Figure 6:
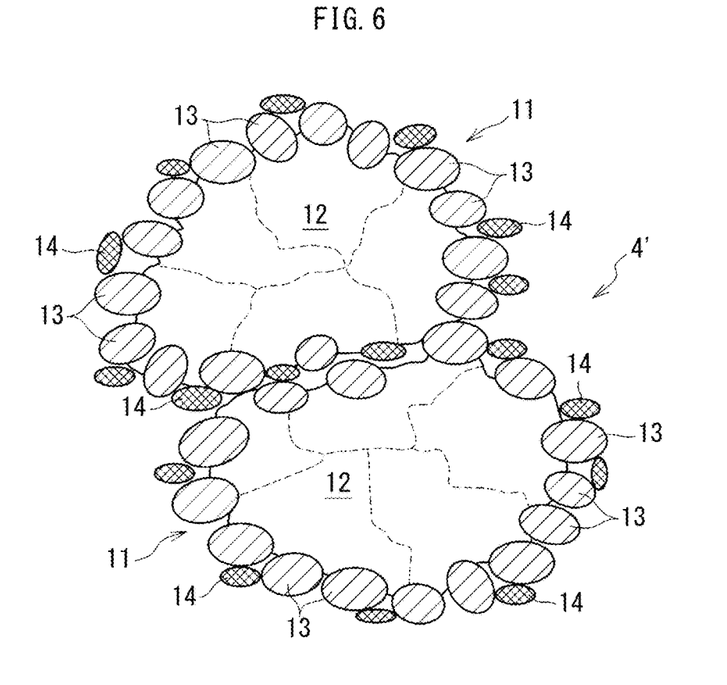
FIG. 6 is a view conceptually showing a part of a green compact.

In the molding die 20 having the aforementioned configuration, after filling a cavity 25 defined by the core 21, the lower punch 23, and the die 24 with the base powder 10, the upper punch 22 is relatively moved to approach the lower punch 23, and the base powder 10 is compacted by an appropriate pressing pressure (which is set depending on the shape and size of the green compact to be molded). As a result, a green compact 4′ having a shape approximate to the sintered bearing 4 is obtained. Then the upper punch 22 is elevated and the lower punch 23 is elevated, and the green compact 4′ is discharged outside the cavity 25. As schematically illustrated in FIG. 6, the diffusion alloyed powder 11, the tin powder 14, and the graphite powder (not illustrated) are uniformly dispersed in the green compact 4′. In the present embodiment, since a reduced iron powder is used as the iron powder 12 forming the diffusion alloyed powder 11, the powder is softer than the diffusion alloyed powder using an atomized iron powder, and is excellent in compaction property. Therefore, it is possible to increase the strength of the green compact 4′ even with low density, and to prevent occurrence of a break or a crack in the green compact 4′.

(C) Sintering Step P3

In the sintering step P3, the green compact 4′ is subjected to a sintering process to obtain a sintered compact. The sintering condition in the present embodiment is such that carbon contained in the graphite powder does not react with iron (carbon will not be diffused). In the equilibrium state of iron and carbon, there is a transformation point at 723° C., and over this point, reaction between iron and carbon starts to form a pearlite phase (γFe) in the iron structure. In the sintering, reaction between carbon (graphite) and iron starts at a temperature exceeding 900° C., and a pearlite phase is formed. Since the pearlite phase has a high hardness of greater than or equal to HV300, if this is present in the iron structure of the sintered bearing 4, it is possible to increase the wear resistance of the bearing surface 4a, and suppress wear of the bearing surface 4a under high surface pressure, to thereby elongate the bearing service life.

Figure 7:
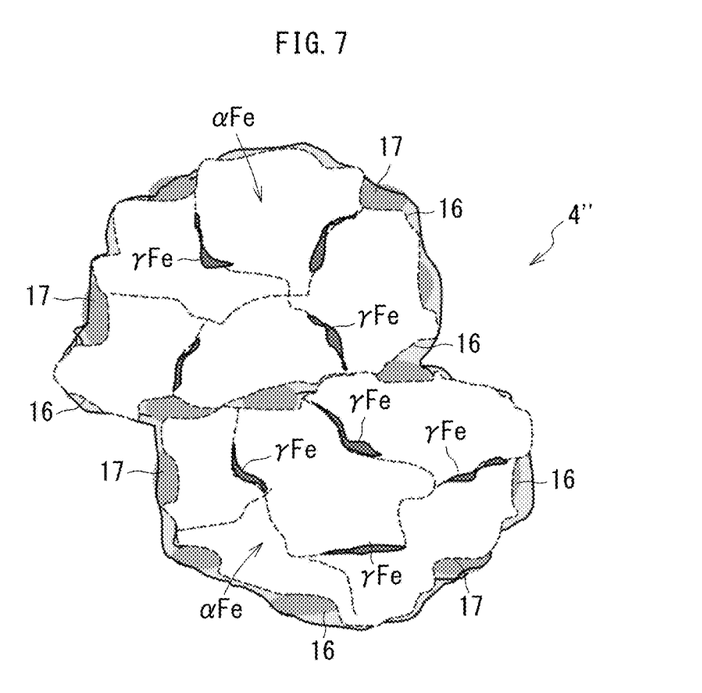
FIG. 7 is a view schematically showing a metal structure of a sintered compact.

In light of this, in the present embodiment, the green compact 4′ is sintered in such a condition that a pearlite phase is contained in the iron structure after sintering (iron structure of the sintered compact), more specifically, the iron structure after sintering is structured by a two-phase structure consisting of a relatively soft ferrite phase (less than or equal to HV200) and a relatively hard pearlite phase. Since the pearlite phase having high hardness strongly attacks the counter member, wear of the shaft 3 can be advanced if the pearlite phase is present abundantly in the iron structure of the sintered bearing 4. For preventing this, as illustrated in FIG. 7, the pearlite phase γFe is so controlled that it is present (scattered) in the grain boundary of the ferrite phase αFe. The "grain boundary" used herein means both a grain boundary formed between powder grains, and a grain boundary formed in a powder grain. In quantitative expression, the existing ratio between the ferrite phase αFe and the pearlite phase γFe in the iron structure is desirably about 80 to 95% and 5 to 20% (αFe: γFe=80 to 95%: 5 to 20%), respectively, by area ratio in an arbitrary section of the sintered compact. As a result, it is possible to obtain the sintered bearing 4 achieving both suppression of wear of the shaft 3, and improvement in the wear resistance of the bearing surface 4a.

A deposition amount of the pearlite phase γFe principally depends on the sintering temperature and the atmospheric gas. Therefore, to obtain an iron structure formed of a two-phase structure consisting of a pearlite phase γFe and a ferrite phase αFe wherein the pearlite phase γFe is such a degree that it is just present in a grain boundary of the ferrite phase αFe, the heating temperature (sintering temperature) of the green compact 4' is set at greater than or equal to 820° C. and less than or equal to 900° C. The sintering atmosphere is a carbon-containing gas atmosphere including an endothermic gas (RX gas) generated by mixing a liquified petroleum gas such as butane or propane and air, and thermally decomposing the mixed gas with a Ni catalyst, natural gas or the like. As a result, carbon contained in the gas is diffused into iron at the time of sintering, and hence the pearlite phase γFe of the degree as described above can be formed. As described above, when the green compact 4' is heated and sintered at a temperature exceeding 900° C., carbon contained in the graphite powder reacts with iron, and the pearlite phase γFe is excessively formed in the iron structure of the sintered compact. Therefore, it is important to set the sintering temperature of the green compact 4' at less than or equal to 900° C. When the base powder 10 contains some molding lubricants such as a fluid lubricant, the molding lubricants are volatilized with sintering.

The sintered compact 4" obtained by heating and sintering the green compact 4' in the above condition contains 10 to 30% by mass (preferably 22 to 26% by mass) of Cu, 0.5 to 3.0% by mass (preferably 1.0 to 3.0% by mass) of Sn, 0.3 to 1.5% by mass (preferably 0.5 to 1.0% by mass) of C, and iron and inevitable impurities as the balance. Thus the metal structure of the sintered compact 4" is mostly formed of iron (iron structure), so that it has excellent mechanical strength. On the other hand, since the sintered compact 4" contains a certain amount of copper in the metal structure, the bearing surface 4a having excellent initial conformability with respect to the shaft 3 can be obtained. In particular, in the aforementioned sintering condition where the sintering temperature of the green compact 4' is set lower than the melting point of copper (1083° C.), the copper powder 13 contained in the green compact 4' does not melt during sintering, and copper does not diffuse in iron (iron structure) during sintering. Therefore, an appropriate amount of copper structure containing a bronze phase is formed on the surface (bearing surface 4a) of the sintered compact 4". Also, free graphite is exposed on the surface of the sintered compact 4". Accordingly, it is possible to obtain the bearing surface 4a having excellent initial conformability with the shaft 3 and a small frictional coefficient. Although the sintered compact 4" (sintered bearing 4) having high mechanical strength can be obtained by increasing the mixing amount of Sn, an excessive amount of Sn leads increase in coarse pores and causes deterioration in the wear resistance of the bearing surface 4a. For this reason, the aforementioned mixing proportion (mixing proportion of about 10% by mass with respect to the mixing proportion of Cu) is selected.

In the sintered compact 4", an iron structure based on iron and a copper structure based on copper are formed. In the present embodiment, since no or a very small amount, if any, of a simple iron powder or a simple copper powder is added to the base powder, every iron structure and copper structure in the sintered compact 4" is formed based on the diffusion alloyed powder 11. In the diffusion alloyed powder, since part of the copper powder is diffused in the iron powder, it is possible to obtain high neck strength between the iron structure and the copper structure after sintering. Also during sintering of the green compact 4', the tin powder 14 in the green compact 4' melts and wets the surface of the copper powder 13 forming the diffusion alloyed powder 11. This is accompanied by advance of liquid phase sintering between tin (Sn) and copper (Cu), and as shown in FIG. 7, a bronze phase (Cu—Sn) 16 binding an iron structure and a copper structure, or copper structures of the neighboring diffusion alloyed powder grains 11 is formed. In each diffusion alloyed powder grain 11, in the portion in which part of the copper powder 13 is diffused on the surface of the iron powder 12 and a Fe—Cu alloy is formed, melted Sn diffuses to form a Fe—Cu—Sn alloy (alloy layer) 17, so that the neck strength between iron structure and the copper structure in the sintered compact 4" is further increased. Accordingly, it is possible to obtain the sintered compact 4", and thus the sintered bearing 4 having high mechanical strength (radial crushing strength), specifically a radial crushing strength of greater than or equal to 300 MPa even by sintering at low temperature as described above without using expensive metal powder such as Ni and Mo. Also, it is possible to improve the wear resistance of the bearing surface 4a by hardening the bearing surface 4a. In FIG. 7, the ferrite phase αFe, the pearlite phase γFe and so on are represented by a shade of color. Specifically, the color is thickened in the order of ferrite phase αFe, bronze phase 16, Fe—Cu—Sn alloy 17, and pearlite phase γFe.

Further, since a powder having an average grain size of less than or equal to 145 mesh (mean grain diameter of less than or equal to 106 μm) is used as the diffusion alloyed powder 11, it is possible to uniform the porous structure of the sintered compact 4" and to prevent generation of coarse pores. Therefore, it is possible to densify the sintered compact 4", and to further improve the wear resistance and the radial crushing strength of the bearing surface 4a.

While coarse pores are likely to arise, particularly in the superficial part of the sintered compact 4" (region spanning from the surface of the sintered compact to 100 μm deep), it is possible to prevent generation of coarse pores in the superficial part as described above and to densify the superficial part with the sintered compact 4" obtained in the manner as described above. Specifically, the porosity of the superficial part can be 5 to 20%. The porosity can be determined, for example, by image analysis of an area proportion of pore parts in an arbitrary section of the sintered compact 4".

Densification of the superficial part in this manner makes it possible to obtain the bearing surface 4a having relatively small surface aperture rate, specifically, the bearing surface 4a having a surface aperture rate of greater than or equal to 5% and less than or equal to 20%. In particular, when the surface aperture rate of the bearing surface 4a is less than 5%, it becomes difficult to make a necessary and sufficient amount of the lubricating oil seep into the bearing gap (oil film forming ability is insufficient), and a merit as the sintered bearing 4 cannot be obtained.

Further, since the base powder used for obtaining the sintered compact 4" is based on the diffusion alloyed powder 11 prepared by partially diffusing the copper powder 13 on the surface of the iron powder 12, it is possible to prevent segregation of copper which is problematic in an existent iron-copper-based sintered bearing.

As described above, the sintering condition of the green compact 4' can be set so that the iron structure after sintering is formed of a two-phase structure consisting of a ferrite phase αFe and a pearlite phase γFe, or so that every iron structure after sintering is a ferrite phase αFe. Specifically, the heating temperature of the green compact 4' is set at greater than or equal to 800° C. (preferably 820° C.) and less than or equal to 880° C., and a gas atmosphere not containing carbon (hydrogen gas, nitrogen gas, argon gas and so on) or a vacuum is selected as the sintering atmosphere. With such a sintering condition, reaction between carbon and iron does not occur in the base powder, and carbon contained in the gas does not diffuse. Therefore, it is possible to form every iron structure after sintering of a soft ferrite phase.

(D) Sizing Step P4

The sintered compact 4" obtained in the manner as described above is subjected to sizing in the sizing step P4. As a result, the sintered compact 4" is finished to a final shape and dimension. The sizing can be conducted as necessary, and need not to be necessarily conducted. That is, if each part of the sintered compact 4" obtained in the sintering step P3 is finished into a desired shape, dimension or the like, the sizing step P4 may be omitted.

(E) Oil-Impregnating Step P5

Internal pores of the sintered compact 4" in which each part is finished to a final shape and dimension are impregnated with the aforementioned lubricating oil (or liquid grease) by a technique such as vacuum impregnation in the oil-impregnating step P5. As a result, the sintered bearing 4 illustrated in FIG. 1 is completed. Depending on the use, the oil-impregnating step P5 may be omitted, and a sintered bearing to be used in an oilless condition may be provided.

As described above, the sintered bearing 4 (sintered compact 4") obtained in the manufacturing process of the present embodiment has a radial crushing strength of greater than or equal to 300 MPa, and this value of radial crushing strength is greater than or equal to twice that of an existent iron-copper-based sintered bearing. The density of the sintered bearing 4 of the present embodiment is $6.8 \pm 0.3$ g/cm$^3$, which is higher than the density of an existent iron-copper-based sintered bearing (about 6.6 g/cm$^3$). Also in the case of an existent iron-copper-based sintered bearing, it can be densified by highly compressing the green compact in compacting step, however, if such a measure is taken, the internal fluid lubricant cannot be combusted at the time of sintering and is gasified, and the pores of the superficial part become coarse. In the manufacturing method according to the present invention, it is possible to prevent such a malfunction without necessity of highly compressing at the time of compaction of the green compact.

In this manner, it is possible to densify the sintered compact 4", and make the oil content of greater than or equal to 15 vol %, and the oil content comparable to that of the existent iron-copper-based sintered bearing can be ensured. This principally results from the fact that as the iron powder 12 forming the diffusion alloyed powder 11, a spongy reduced iron powder having excellent oil retentivity is used. In this case, the lubricating oil impregnated in the sintered compact 4" is retained not only in the pores formed between grains of the sintered structure, but also in the pores possessed by the reduced iron powder.

As described above, since the sintered bearing 4 obtained in the manufacturing method according to the present invention is formed of the sintered compact 4" having high radial crushing strength (radial crushing strength of greater than or equal to 300 MPa), even when the sintered bearing 4 is fixed to the inner periphery of the housing 2 by press-fitting, the bearing surface 4a does not deform in conformance with the inner periphery surface shape of the housing 2, and the circularity, cylindricity or the like of the bearing surface 4a can be stably maintained even after attachment. Therefore, it is possible to obtain desired circularity (for example, circularity of less than or equal to 3 μm) without additionally executing a process for finishing the bearing surface 4a to have an appropriate shape and accuracy (for example, sizing) after fixing the sintered bearing 4 to the inner periphery of the housing 2 by press-fitting. In addition, since the bearing surface 4a has high wear resistance, even if the shaft 3 swingably rotates along the whole surface of the bearing surface 4a, or the shaft 3 frequently collides with the bearing surface 4a, wear or damage on the bearing surface 4a is restrained. Therefore, according to the sintered bearing 4 obtained in the manufacturing method according to the present invention, it is possible to provide a vibration motor having excellent reliability and durability at low cost.

Figure 8:
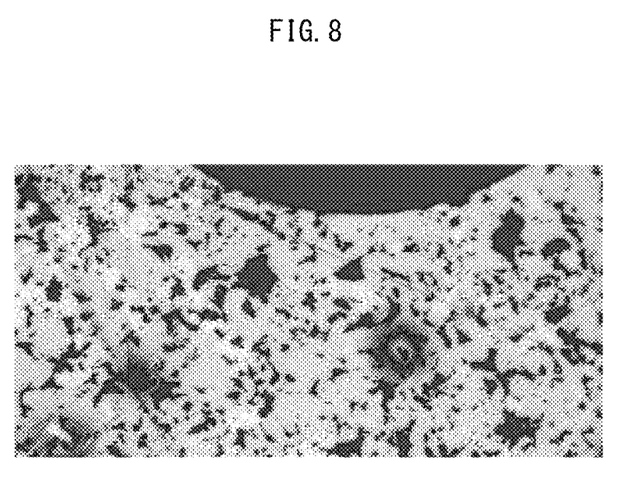
FIG. 8 is a microphotograph of an X part in FIG. 2.
Figure 9:
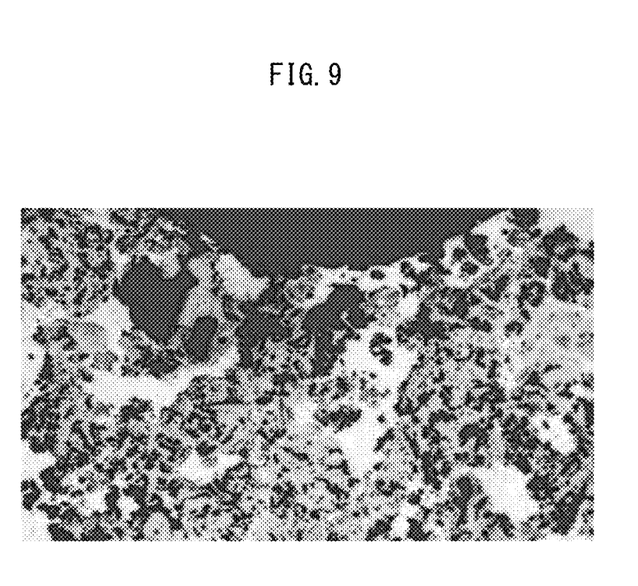
FIG. 9 is a microphotograph in the vicinity of the bearing surface of the sintered bearing according to a conventional art.

Here, for the purpose of reference, a microphotograph of the superficial part of the sintered bearing 4 obtained in the manufacturing method according to the present invention is shown in FIG. 8, and a microphotograph of a superficial part of a sintered bearing according to the art described in Patent Document 1 (hereinafter, referred to as "copper-coated iron powder bearing") is shown in FIG. 9. In comparison between FIG. 8 and FIG. 9, it is easily understood that in the sintered bearing 4, the porous structure of the superficial part is compact in comparison with that of the copper-coated iron powder bearing. Actually, while the porosity of the superficial part of the sintered bearing 4 is 13.6%, the porosity of the superficial part of the copper-coated iron powder bearing is about 25.5%. One of the reasons of such difference is insufficient neck strength between iron structure and copper structure because the copper film merely closely adheres to the iron powder in the copper-coated iron powder.

Embodiments of the present invention are not limited to those described above, and appropriate modification may be made without departing from the subject matter of the present invention.

For example, while the case of forming every iron structure and copper structure of the sintered bearing 4 solely of the diffusion alloyed powder has been described, part of the iron structure or copper structure may be formed of a simple iron powder or a simple copper powder by adding either one or both of the simple iron powder and the simple copper powder to the base powder. In this case, for ensuring the minimum wear resistance, strength, and the sliding properties, the proportion of the diffusion alloyed powder in the base powder is preferably greater than or equal to 50% by mass. In this case, an appropriate mixing proportion of the solid lubricant powder in the base powder is 0.3 to 1.5% by mass. Further, the mixing proportion of the low-melting-point metal powder in the base powder is 0.5 to 5.0% by mass. This mixing proportion is preferably set at about 10% by mass of the total amount of the copper powder in the base powder (sum of a copper powder in the diffusion alloyed powder and a separately added simple copper powder). The base powder is formed of a simple iron powder or a simple copper powder (or both simple powders), and inevitable impurities as the balance.

In such a configuration, by changing the mixing amount of the simple iron powder or the simple copper powder, it is possible to adjust the bearing characteristics while keeping the wear resistance, high strength, and excellent sliding characteristics obtained by using the diffusion alloyed powder. For example, by adding the simple iron powder, it is possible to enhance the wear resistance and the strength of the bearing while reducing the cost by reduction of the use amount of the diffusion alloyed powder, and by adding a simple copper powder, it is possible to further improve the sliding characteristics. Therefore, it becomes possible to reduce the cost for developing the sintered bearing suited for various uses, and to enable production of multiple models in smaller lots of sintered bearings.

For example, in the compacting step P2 of compacting the green compact 4', a so-called warm compaction in which the green compact 4' is compacted while at least one of the molding die 20 and the base powder 10 is heated, or a die wall lubricating compaction in which the green compact 4' is compacted while a lubricant is applied to the molding surface of the molding die 20 (the surface defining the cavity 25) may be employed. By employing such a method, it is possible to mold the green compact 4' more accurately.

Although the vibration motor 1 described above is of the shaft rotating type in which the shaft 3 is rotative and the sintered bearing 4 is stationary, the vibration motor 1 may be of a shaft stationary type in which the shaft 3 is stationary and the sintered bearing 4 is rotative, and the sintered bearing 4 obtained in the manufacturing method according to the present invention can be preferably applied to the vibration motor 1 of such a shaft stationary type. Further, the bearing surface 4a of the sintered bearing 4 can be provided with a dynamic pressure generating part such as a dynamic pressure groove. This makes it possible to increase the rigidity of the oil film formed in the bearing gap, and thus to further increase the rotation accuracy. Further, the sintered bearing 4 obtained in the manufacturing method according to the present invention has various uses including use for supporting a principal axis of a high-speed motor with a large unbalanced load, use as a bearing for rotatably supporting a shaft while it is incorporated into various motors, as well as use for a vibration motor because of its high mechanical strength and excellent wear resistance of the bearing surface 4a.

DESCRIPTION OF REFERENCE SIGNS

1: Vibration motor
2: Housing
3: Shaft
4: Sintered bearing
4': Green compact
4": Sintered compact
4a: Bearing surface
10: Base powder
11: Diffusion alloyed powder
12: Iron powder
13: Copper powder
14: Tin powder (low-melting-point metal powder)
16: Bronze phase
17: Fe—Cu—Sn alloy
20: Molding die
αFe: Ferrite phase
γFe: Pearlite phase
M: Motor part
P1: Base powder generating step
P2: Compacting step
P3: Sintering step
W: Weight

The invention claimed is:

1. A vibration motor comprising:
a shaft;
a motor part for rotationally driving the shaft;
a sintered bearing having a bearing surface on an inner periphery thereof, for rotatably supporting the shaft;
a weight disposed on the shaft; and
a housing having an inner periphery on which the sintering bearing is fixed by press-fitting, the vibration motor generating vibration by making the shaft eccentrically rotate with respect to the bearing center by the weight,
wherein the sintered bearing is formed of a sintered compact containing iron as a main ingredient, copper as a second major ingredient, and an element selected from tin, zinc, and phosphorus, and has a radial crushing strength of greater than or equal to 300 MPa,
wherein the sintered bearing includes an iron structure and copper structures which are formed by sintering a diffusion alloyed powder formed by diffusing a plurality of copper powders on a surface of an iron powder, the copper structures being partly diffused in the iron structure, and the copper structures being mutually bonded by the element,
wherein the copper structures have a smaller size than that of the iron structure, and an entirety of the sintered bearing is free from a segregation of the copper structures, and
wherein the diffusion alloyed powder has a mean grain diameter of less than or equal to 106 μm, and does not contain 25% by mass or more of grains having the mean grain diameter of less than or equal to 45 μm.

2. The vibration motor according to claim 1, wherein the sintered bearing further comprises free graphite.

3. The vibration motor according to claim 2, wherein the iron powder of the diffusion alloyed powder is a reduced iron powder.

4. The vibration motor according to claim 2, wherein the sintered compact is composed of 10 to 30% by mass of copper, 0.5 to 3.0% by mass of tin, 0.3 to 1.5% by mass of carbon, and iron and inevitable impurities as a balance.

5. The vibration motor according to claim 1, wherein the iron structure of the sintered compact is based on a ferrite phase.

6. The vibration motor according to claim 1, wherein the iron structure of the sintered compact is composed of a ferrite phase, and a pearlite phase existing in a grain boundary of the ferrite phase.

7. The vibration motor according to claim 1, wherein porosity of a superficial part of the sintered compact is 5 to 20%.

8. The vibration motor according to claim 1, wherein the sintered compact is impregnated with a lubricating oil having a kinematic viscosity at 40° C. ranging from 10 to 50 mm$^2$/s.

9. The vibration motor according to claim 1, wherein a sintered bearing is disposed on both sides in an axial direction of the motor part.

10. The vibration motor according to claim 9, wherein of the sintered bearings disposed on both sides in the axial direction of the motor part, the sintered bearing of one side is disposed between the weight and the motor part, and an axial dimension of the sintered bearing of the one side is larger than an axial dimension of the sintered bearing of the other side.

* * * * *